United States Patent [19]
Tout et al.

[11] Patent Number: 5,991,295
[45] Date of Patent: Nov. 23, 1999

[54] DIGITAL SWITCH

[75] Inventors: Arthur James Viggo Tout, Berkshire; Stephen Mark Johnson, Bucks, both of United Kingdom

[73] Assignee: Madge Networks Limited, Buckinghamshire, United Kingdom

[21] Appl. No.: 08/729,755

[22] Filed: Oct. 7, 1996

Related U.S. Application Data

[60] Provisional application No. 60/007,542, Nov. 24, 1995.

[30] Foreign Application Priority Data

Oct. 10, 1995 [GB] United Kingdom ................... 9520686

[51] Int. Cl.[6] .................................................. H04L 12/56
[52] U.S. Cl. .......................................... 370/376; 370/395
[58] Field of Search ................................... 370/237, 428, 370/429, 412, 415, 416, 410, 468, 418, 414, 229, 375, 376, 395

[56] References Cited

U.S. PATENT DOCUMENTS

| | | | |
|---|---|---|---|
| 5,132,966 | 7/1992 | Hayano et al. | 370/468 |
| 5,452,330 | 9/1995 | Goldstein | 375/257 |
| 5,521,913 | 5/1996 | Gridley et al. | 370/428 |
| 5,570,355 | 10/1996 | Dail et al. | 370/352 |
| 5,640,387 | 6/1997 | Takahashi et al. | 370/359 |

*Primary Examiner*—Michael Horabik
*Assistant Examiner*—Kevin C. Harper
*Attorney, Agent, or Firm*—Sughrue, Mion, Zinn, Macpeak & Seas, PLLC

[57] ABSTRACT

A switch fabric is provided which comprises a shared memory, a number of switch fabric ports, and a switch fabric data controller. The switch fabric data controller routes blocks of data received at one switch fabric port to one or more other switch fabric ports and writes and reads data to and from, respectively, the shared memory. The switch fabric data controller preferentially routes a block of data from the one switch fabric port to the one or more other switch fabric ports without writing the block of data into the shared memory if the one or more other desired switch fabric ports are free or become free within a predetermined period, and otherwise writes the block of data into the shared memory for temporary storage if the one or more other switch fabric ports are busy. In this manner, the switch fabric facilitates "cut-through" of blocks of data across a switch without the need to write the blocks of data to a shared memory, thereby reducing latency.

17 Claims, 7 Drawing Sheets

DIGITAL SWITCH

The present application claims the benefit of Provisional Application No. 60/007,542, filed Nov. 24, 1995.

The present invention relates to digital switches and in particular, digital switches used in ATM networks.

BACKGROUND OF THE INVENTION

The nature of asynchronous transfer mode (ATM) is such that cell loss and cell delays are important issues which must be addressed. An essential requirement of an ATM network is that the network must be able to handle multiple traffic classes with different quality of service (QOS) requirements while maximising statistical sharing and utilisation of network resources and minimising cell loss and cell delay.

An implementation of ATM is specified in international standards and industry agreements. The ATM cell format consists of a 5-byte header and 48-byte information field. The main purpose of the cell header is identification of the required virtual path and virtual channel. Other header fields allow identification of payload type, forward-congestion indication, cell loss priority (CLP), and header error control (HEC).

ATM switching systems are network elements that support the functions of cell transport, connection admission control (CAC), traffic control and network management. While standards specify the network functions, they do not specify their implementation at the switch level. Broadly speaking, an ATM switch comprises a set of input ports and output ports through which the switch is interconnected to users, other switches, and other network elements. Cells are received by input modules at the switch input ports and prepared for routing through the switch. The routing is performed by a cell switch fabric. Finally, the cells are prepared for transmission by output modules at the switch output ports. The input modules, output modules, and cell switch fabric together perform the basic cell routing and buffering functions required in ATM switching.

At each input port, an initial function of an input module is the extraction and delineation of a received ATM cell stream. The cells must then be prepared for routing through the cell switch fabric. This involves checking the cell header for errors, validation and translation of the virtual path identifier (VPI) and virtual channel identifier (VCI) values, determination of the destination output port and the addition of an internal tag. The internal tag may, for example, include information relating to internal routing such as the destination output port, loss tolerance, delay priority and broadcast/multicast connection identifier. Since the internal tag exists only within the switch, its contents are determined entirely by the design of the switch. The internal tag is subsequently removed at the output modules.

The output modules perform many of the reverse functions of the input modules. Their primary task is to prepare ATM cell streams for physical transmission.

SUMMARY OF THE INVENTION

The cell switch fabric is primarily responsible for transferring cells between the input modules and output modules in accordance with the internal tag attached to each cell. Other possible functions of the cell switch fabric include cell buffering, traffic concentration and multiplexing, redundancy for fault tolerance, multicasting or broadcasting, cell scheduling based on delay priorities, selective cell discarding based on loss priorities, and congestion monitoring.

The present invention relates to a switch which has a shared memory architecture. In a typical example of an ATM switch with this architecture, all incoming ATM cells are converted from serial to parallel form and written sequentially into a buffer memory. Their cell headers with internal routing tags are delivered to a data controller, which decides the order in which cells are read out of the memory. The outgoing cells are demultiplexed to the output ports where they are converted from parallel to serial form. Functionally, this is an output queuing approach, where the output buffers all physically belong to a common pool and has the advantage of minimising the amount of buffers required to achieve a specified cell loss rate. The design offers sufficient flexibility to accommodate traffic dynamics in that the shared memory can absorb large bursts directed to any output. However, each cell must be written into and read out from the memory one at a time, thus introducing an undesirable degree of cell latency. The throughput of the switch is limited by the memory access time.

According to a first aspect of the present invention, a switch fabric comprises:
a shared memory;
a number of switch fabric ports; and,
a switch fabric data controller for routing blocks of data received at one switch fabric port to one or more other switch fabric ports and writing and reading data to and from, respectively, the shared memory, wherein the switch fabric data controller preferentially routes a block of data from the one switch fabric port to the one or more other switch fabric ports without writing the block of data into the shared memory if the one or more other desired switch fabric ports are free or become free within a predetermined period, and otherwise writes the block of data into the shared memory for temporary storage if the one or more other switch fabric ports are busy.

The switch fabric of the present invention facilitates "cut-through" of blocks of data across a switch without the need to write the blocks of data to a shared memory. This reduces latency. This is particularly important in the field of ATM where blocks of data i.e. ATM cells, must pass through a network switch with minimal delay.

Preferably, the switch fabric ports are full duplex.

ATM supports multiple traffic classes. These include connection-orientated bit rate traffic (CBR), connection-orientated variable bit rate traffic (VBR), and available bit rate traffic (ABR) or unspecified bit rate traffic (UBR). The highest priority is given to the delay sensitive CBR traffic. In an ATM switch including a switch fabric in accordance with the first aspect of the present invention, upon receipt of a cell, the switch fabric data controller determines if a desired switch fabric output port is free to transmit a cell and resolves any contest for the switch fabric output port with any cell in shared memory.

According to a second aspect of the present invention, an apparatus for multiplexing N datastreams comprises:
N input ports;
an output port; and,
means for repeatedly generating N slots having a predetermined length for receiving data arriving at the input ports and transmitting the data as a multiplexed datastream at the output port, wherein a slot may initially be exclusively allocated to one input port for transmitting data received at the input port and subsequently the slot can be re-allocated to another input port when the one input port releases control of the slot.

A conventional traffic concentrator for use in an ATM switch generates slots which are permanently allocated to one input port only. Data arriving at an input port has to wait until its respective slot is available before data can be transmitted from the output port as part of a time division multiplexed (TDM) datastream. This type of traffic concentrator is only efficient when continuous datastreams are arriving at each input port. In contrast, the apparatus of the second aspect of the present invention has variable slot allocation so that an input port with data to transmit is allocated control of the next available slot in the series of repeatedly generated slots and control of that slot is only relinquished when no data is detected at the input port. When implemented as a traffic concentrator in an ATM switch, the apparatus of the second aspect of the present invention substantially reduces the degree of undesirable latency in the switch, especially when non-continuous streams of data are being received.

Concentration of ATM traffic may be performed before the switch fabric, either remote from the switch or within the switch. In the present invention it is preferred that the traffic concentrator forms part of the cell switch fabric. Most preferably, the switch fabric of the first aspect of the present invention is provided with one or more traffic concentrators in accordance with the apparatus of the second aspect of the present invention.

The length of the slots in the traffic concentrator is chosen in accordance with the size of the block of data received at the input port. Preferably, the length of each slot is a fraction $1/X$ of the size of the block of data, where X is a positive integer. In an example of an ATM switch in accordance with the present invention, a 53-byte ATM cell extracted at an input module of the ATM switch is prepended with a 3-byte internal tag to create a modified 56-byte ATM cell for subsequent routing through the switch fabric. The 56-byte cell is received at a switch fabric port and is allocated the first free slot which becomes available to the port. The length of the slot is chosen to be $1/4$ of the size of the cell i.e. X=4, to transmit the cell in 14-byte segments as part of a TDM datastream at the output port of the traffic concentrator for subsequent processing by the data controller of the switch fabric. Modified cells arriving at another switch fabric port are allocated the first free slot of the remaining slots to transmit these modified cells in 14-byte segments. In this example, the traffic concentrator is provided with 5 input ports, each at 155 Mbps, a single output port at 800 Mbps, and the apparatus repeatedly generates five slots. The number of traffic concentrators in the switch fabric is determined by the number of switch fabric ports.

Preferably, the switch fabric comprises one or more traffic concentrators connected to the switch fabric data controller. Preferably, each of the one or more multiplexed datastreams are transmitted to the switch fabric data controller on a respective 8-bit wide data bus. If the number of switch fabric ports is increased then either the number of traffic concentrators connected to the switch fabric data controller may be increased, or alternatively, two or more switch fabric data controllers may be provided, with groups of traffic concentrators allocated to a respective switch fabric data controller. In the latter case, the switch fabric data controllers are connected so that they can communicate with each other to enable data to be routed from one switch fabric port associated with one switch fabric data controller to a switch fabric port associated with a different switch fabric data controller.

The switch fabric data controller may be provided with a dynamically allocatable combined input/output buffer for storing blocks of data arriving from the one or more traffic concentrators prior to cut-through to one or more of the switch fabric ports or writing to the shared memory. The combined input/output buffer would be shared by the traffic concentrators and storage space allocated according to demand. However, preferably, the switch fabric data controller is provided with an input buffer for storing blocks of data arriving from the one or more traffic concentrators prior to cut-through or writing to the shared memory and a separate output buffer for storing blocks of data to be routed from the switch fabric data controller to one or more of the switch fabric ports.

In the example of an ATM switch, preferably both the input buffer and output buffer are provided with space sufficient to store two modified 56-byte ATM cells for each of the N switch fabric ports. Each 2 cell space in the input and output buffers is reserved for one switch fabric port only and is not shared by the other ports.

The switch fabric data controller transfers blocks of data from an input buffer to the appropriate output buffer. In the example of an ATM switch, the modified ATM cells arrive in quarter cell segments at the appropriate location in the input buffer of the switch fabric data controller associated with the switch fabric port the data arrived from. Preferably, the switch fabric data controller holds the cell segments received sequentially at the input buffer whilst monitoring the output buffer and if the location in the output buffer associated with the required switch fabric port becomes free before the entire modified ATM cell has been received, transfers the entire cell to the output buffer.

Most preferably, the switch fabric data controller commences the transfer of the first and subsequent segments of the modified ATM cell as soon as the required location in the output buffer becomes free, irrespective of whether the entire modified ATM cell has been received at the input buffer. If, for example, the output buffer is free when the first quarter cell segment arrives at the input buffer, the switch fabric data controller transfers this segment to the output buffer without first waiting for the remaining three segments. Subsequent quarter cell segments of the same modified ATM cell are also transferred directly to the output buffer. Once one or more segments of a modified ATM cell have been transferred directly to the output buffer the switch fabric data controller is committed to transferring the complete cell. This feature, called "cut through", increases the speed of the switch, reduces cell latency, and maximises use of available internal bandwidth.

If the required location in the output buffer is not free by the time the last segment is received at the input buffer, the switch fabric data controller writes the entire modified ATM cell to a queue in the shared memory. Preferably, the shared memory is arranged so that modified ATM cells with different traffic classes are queued separately from one another according to priority.

At any point in time, the switch fabric data controller has to service three queues: a "cut-through" queue from the input buffer to the output buffer, a write queue from the input buffer to the shared memory; and, a read queue from the shared memory to the output buffer. The present invention maximises the amount of modified ATM cells routed directly through the switch fabric without being written into shared memory. This significantly reduces cell latency.

Preferably, the switch fabric includes a shared memory data bus which is sufficiently wide to transfer the same fraction $1/X$ of the block of data to the shared buffer memory as that transferred by a traffic concentrator in a single slot, where X is a positive integer, and the switch fabric data controller writes and reads blocks of data to and from, respectively, the shared memory on the shared memory data bus.

Preferably, the shared memory is arranged as two banks each having a predetermined depth and at least the same width as the shared memory data bus.

According to the third aspect of the present invention, a method of writing a segmented block of data to a memory device, the memory device comprising two or more banks of memory, in which a first segment of the block of data is written to an address in a first bank of memory and a second segment is written sequentially into a corresponding address in a second bank of memory.

Preferably, the address of the first bank of memory is held in an address buffer and an address latch is provided for latching the address held by the address buffer to enable the second segment of the block of data to be written sequentially to the corresponding address in the second bank of memory.

The block of data may be segmented into any number of smaller blocks of data for writing to a corresponding number of banks of memory. Preferably, the block of data is uniformly segmented so that the segments are of equal size.

Preferably, the segments of the block of data are read from the two or more banks of memory using the reverse process to re-assemble the original block of data.

For an ATM switch, preferably the shared memory is controlled according to the third aspect of the present invention. In particular, it is preferred that the switch fabric data controller further comprises an address buffer driven by the switch fabric data controller for holding the value of an address in one bank of the shared memory to allow a segment of data from a block of data held in the input buffer of the switch fabric to be written to that address, and an address latch for latching the address held by the address buffer to enable a successive segment of the block of data held in the input buffer to be written sequentially to the corresponding address in the other bank of the shared memory.

In the example of an ATM switch, the shared memory data bus comprises a quarter cell width data bus i.e. 14-bytes wide. All cells are written to or read from the shared memory over four consecutive 20 nanosecond cycles. Preferably, the shared memory is arranged as two 64K deep banks which are 14 bytes wide. The first and third quarter cell segments are written to one bank whilst the second and fourth quarter cell segments are written to the other bank, where the first and second cell segments and the third and fourth cell segments, respectively, have the same memory address value due to the address latching action. Latching the addresses of the two banks of the shared memory in this manner optimizes the memory access time. Current minimum write times for SRAM are of the order of 30 nanoseconds, effectively 10 nanoseconds slower than is achieved in the present invention.

The switch fabric uses a reverse process to read cells sequentially from the two banks of the shared memory to the required location in the output buffer.

Preferably, the functions of the switch fabric controller are implemented on a single ASIC.

Preferably, the switch fabric data controller includes means for repeatedly generating N slots each having a predetermined length for receiving data arriving at the output buffer and transmitting the data as a multiplexed datastream from the output buffer to one or more of the switch fabric ports.

Preferably, each of the N slots is permanently and exclusively allocated to one respective switch fabric port for the transmission of data from the output buffer to the switch fabric port. Preferably, the data is transmitted on an 8-bit wide data bus.

Preferably, the length of each slot generated by the switch fabric data controller is fraction $\frac{1}{2}x$ of the size of the block of data, where X is a positive integer. In the example of an ATM switch where X=4, each slot generated by the switch fabric data controller is capable of transferring $\frac{1}{8}$th segments of modified ATM cells i.e. 7-bytes in each slot. Each slot has an interval of seven 100 MHz cycles. The switch fabric data controller repeatedly generates five such slots which coincides with the number of slots in each of the multiplexed datastreams linking the one or more traffic concentrators and the input buffer.

Preferably, the switch fabric further comprises traffic expansion means for demultiplexing the one or more datastreams from the output buffer of the switch fabric data controller ASIC to the switch fabric ports. Preferably, the traffic concentrator in accordance with the apparatus of the second aspect of the present invention and the traffic expansion means are implemented together on a traffic control ASIC, the switch fabric ports being full duplex ports. In this case, the switch fabric data controller generates a number of data-streams, each being connected on a full duplex 8-bit wide data bus to a respective traffic control ASIC so that a switch fabric comprises a single switch fabric data controller ASIC, a number of connected traffic control ASICs, and a shared memory.

BRIEF DESCRIPTION OF THE DRAWINGS

The present invention allows the production of digital switches suitable for use in ATM networks which meet the requirements of ATM broadband communication standards currently being developed.

These and other aspects of the present invention will now be described with reference to the accompanying drawings, in which:

In FIG. 1, an ATM switch 1 comprises four port cards 2, each having four full duplex switch ports 3 connected to a back plane 4. Also connected to the back plane 4 is a switch fabric card 5 and an MPU card 6.

DETAILED DESCRIPTION OF THE PREFERRED EMBODIMENTS

Figure 1:
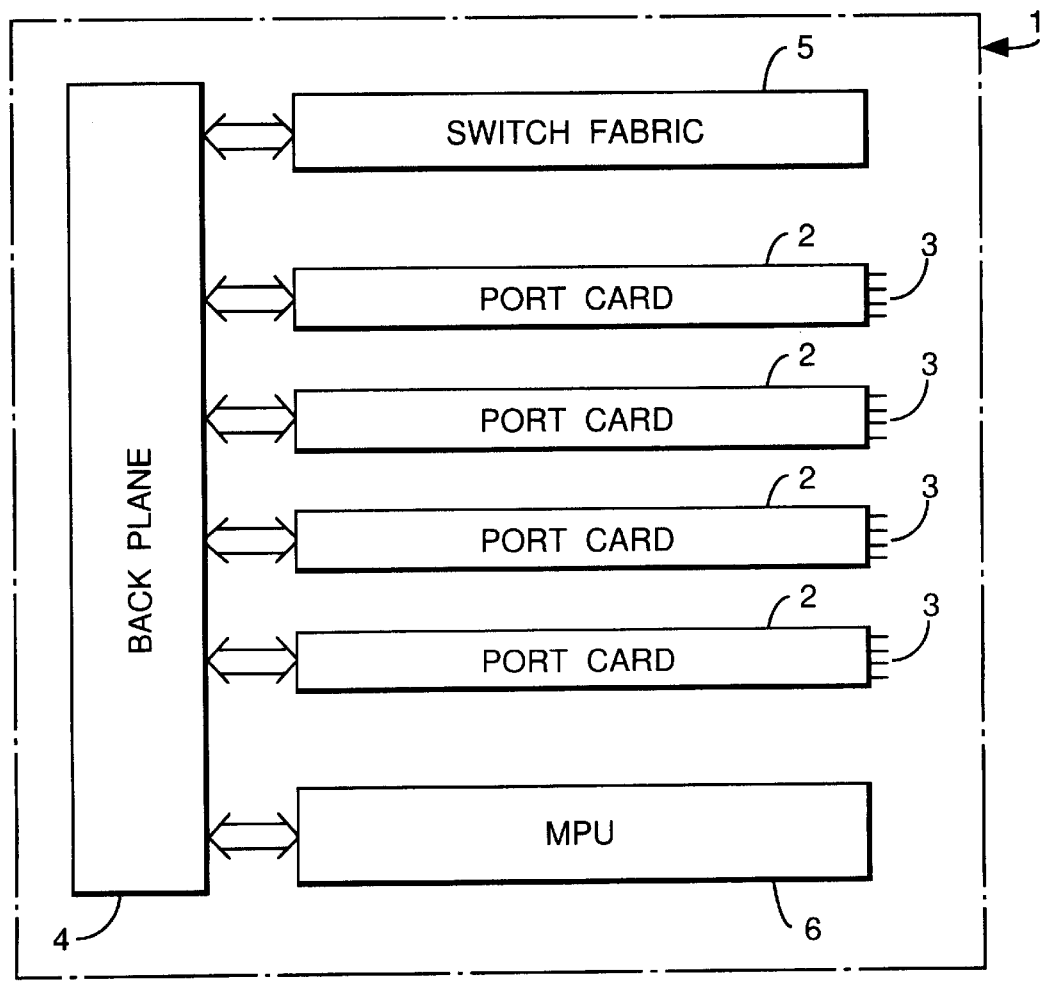
FIG. 1 shows a simplified example of an ATM switch.

Data is transferred from a switch input port to a switch output port by means of an ATM cell. An ATM cell consists of a 5-byte ATM header followed by a 48-byte information payload carrying user data. Data is received and transmitted serially over either fibre or twisted pair cables connected to the switch ports 3. At the interface between the port cards 2 and the switch fabric card 5 the data is 8-bit parallel with a single bit start of cell signal. An ATM cell passing from a port card 2 to the switch fabric card 5 is prepended with a 3-byte internal routing tag which is generated using a look-up algorithm from the contents of the address fields in the ATM header. The prepended routing tag comprises 2 bits defining the service class and a further 18 bits identifying one or more destination ports. The remaining 4 bits are reserved. The internal routing tag is removed when the cell is prepared for transmission from the appropriate port card 2.

Figure 2:
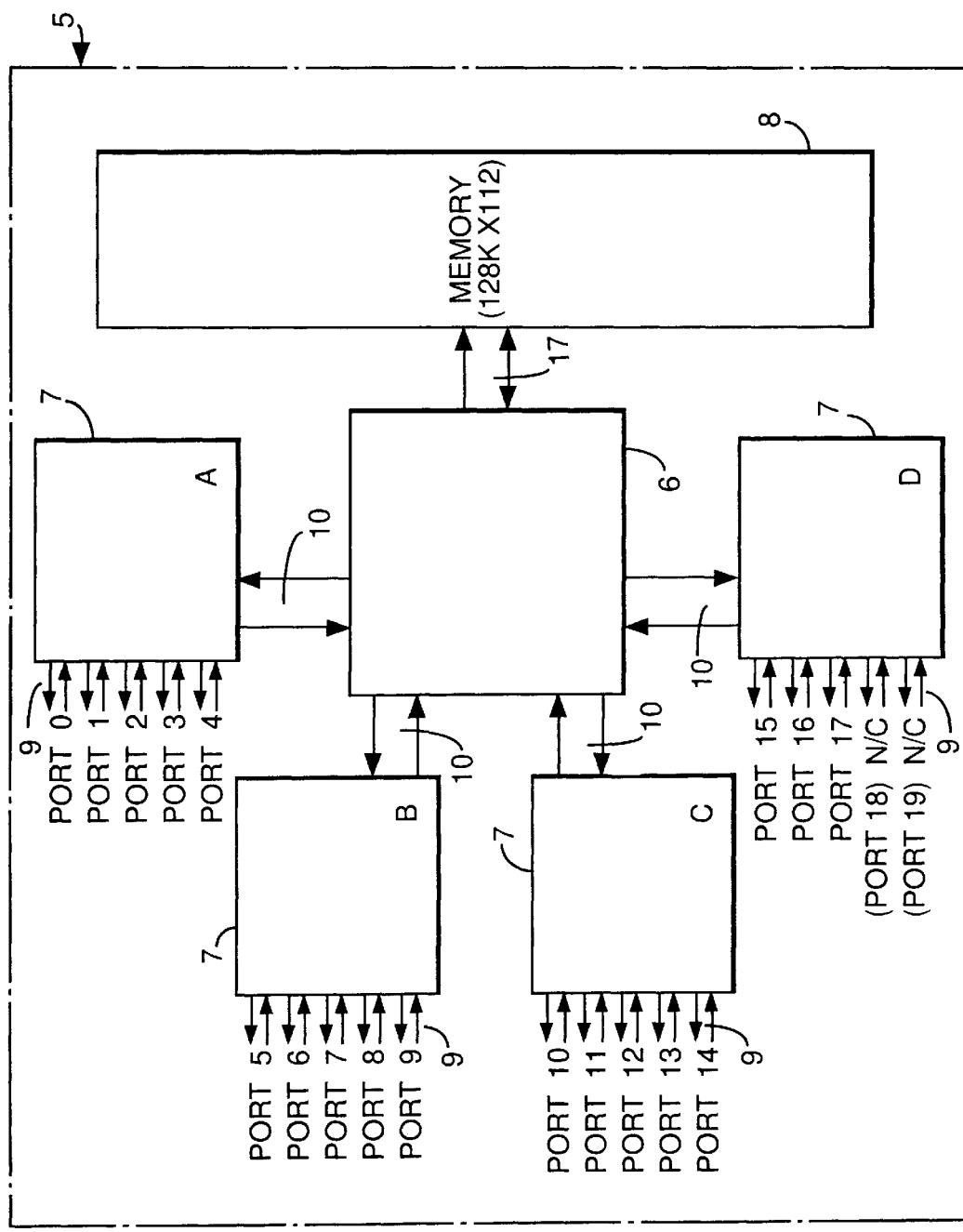
FIG. 2 shows an example of the general architecture of a switch fabric in accordance with the present invention.

FIG. 2 shows schematically the layout of the switch fabric card 5. The switch fabric card 5 comprises a switch fabric data controller ASIC 6 connected to four traffic control ASICs 7 and a shared memory 8.

As shown, the switch fabric card 5 uses a shared memory 8 to provide large buffering of ATM cells. This becomes necessary when the total input port bandwidth transmitted to any given output port exceeds the output bandwidth of 155.52 Mbps. A total of 1.7 MB of single ported external Fast SRAM chips are provided.

Each of the traffic control ASICs 7 has the function of concentrating five full duplex switch fabric ports 9 at 155 Mbps each into a single full duplex 800 Mbps stream. This stream is carried on an 8-bit data bus 10 with control signals which delivers the 56-byte ATM cells to the switch fabric controller ASIC 6 in quarter cell segments, i.e. 14-bytes. This allows each switch fabric port 9 to pass data to the switch fabric data controller ASIC 6 without having to wait for complete cells. This gives a more balanced latency and contributes to the overall low latency of the ATM switch.

The datastream from each traffic control ASIC 7 to the switch fabric data control ASIC 6 is a time division multiplexed (TDM) stream of five repeating slots each marked by an active high strobe signal. Each slot has an interval of fourteen 100 MHz cycles with the strobe signal active during the first cycle of each slot. A complete quarter cell segment from a switch fabric port 9 can be transmitted in one such slot.

There is no fixed mapping between the five switch fabric ports 9 and the five repeating slots. The first quarter cell segment to arrive from any switch fabric port will be transmitted in the next available slot and will reserve that slot for all four segments of the cell using flags. The slot will only be released for re-allocation if a non-continuous stream of ATM cells is being received at that port.

The switch fabric data controller ASIC 6 returns the 56-byte ATM cells to the traffic control ASIC 7 using the 800 Mbps stream in eighth cell segments, i.e. 7-bytes. This allows the traffic control ASIC 7 to start transmitting data from the switch fabric data controller ASIC 6 back to a desired switch port 3 on a port card 2 without the need for the switch fabric data controller ASIC 6 to be in possession of a complete cell.

Figure 3:
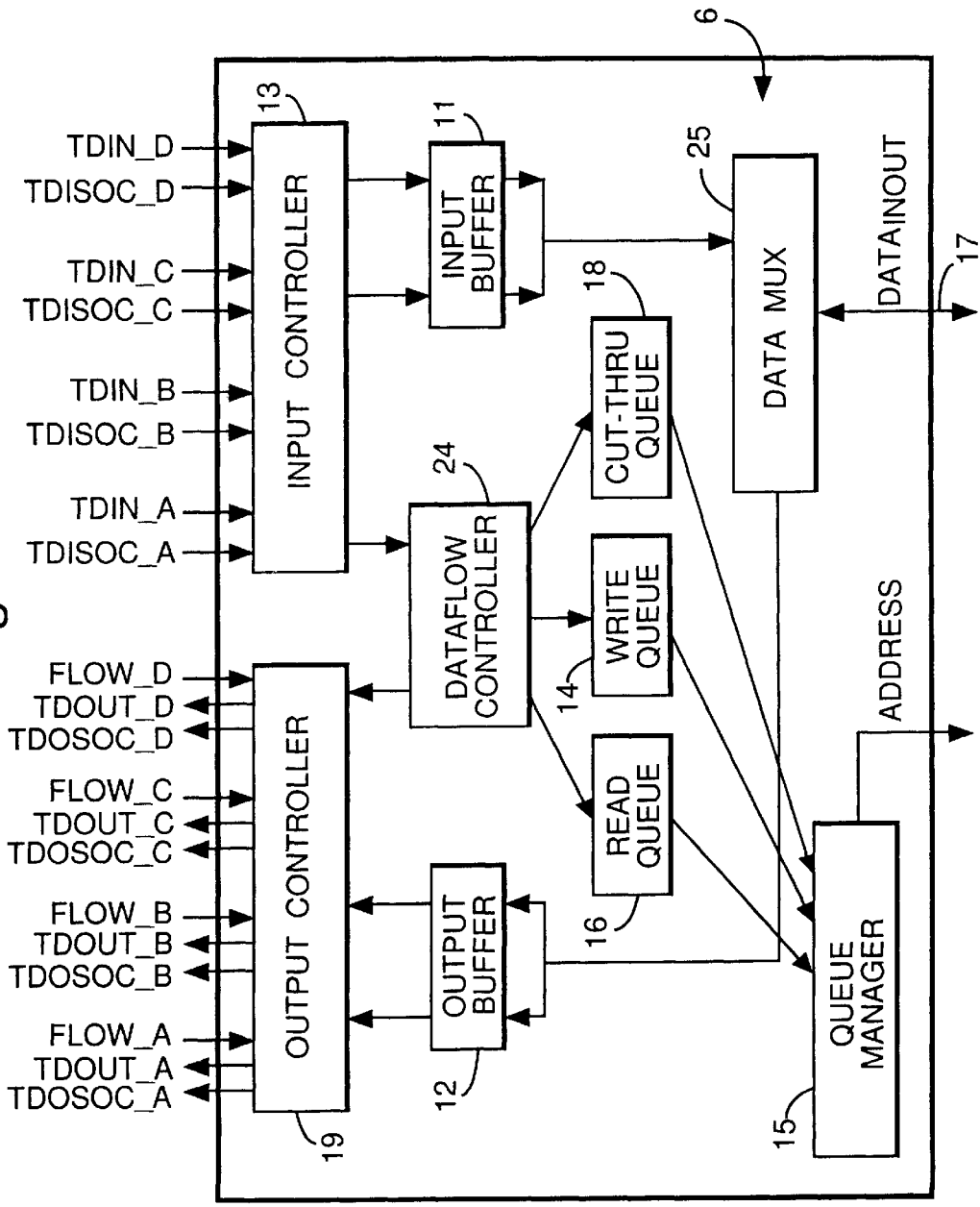
FIG. 3 shows a simplified block diagram of a switch fabric data controller ASIC.

FIG. 3 shows schematically the internal architecture of the switch fabric data controller ASIC 6. The switch fabric data controller ASIC 6 includes a dual port input memory buffer 11 and a dual port output memory buffer 12 for storing ATM cells. An input controller 13 directs ATM cells arriving from a traffic control ASIC 7 to the location in the input buffer 11 allocated to the associated input port of the switch fabric. The input buffer is provided with space sufficient to store two ATM cells for each switch fabric input port 9. The output buffer 12 stores cells currently being transmitted to a traffic control ASIC 7 from the switch fabric data controller ASIC 6, again with two cells being allocated for each switch fabric port 9.

The first quarter cell segment arriving from a switch fabric port 9 finding a desired non-busy output buffer location can be transferred directly to that location by a data multiplexer 25 along a 14 byte wide bus under the control of a queue manager 15. Subsequent arriving quarter cell segments from the same cell are also transferred directly to the required location. This transfer uses some internal switching bandwidth and must be immediate in order to eliminate data under-run. Other internal data flow activities take a lower priority. This immediate cut-through facility is only available if the required output port buffer 12 has at least one complete cell buffer free. Otherwise, the first quarter cell segment is written into the input buffer 11.

A partial or complete cell in the input buffer 11 consisting of two or more quarter cell segments can be transferred to the output buffer 12 when a free location becomes available of the two cell locations allocated to the required destination switch fabric port 9. Each command is placed on a cut-through queue 18 and serviced in turn by the queue manager 15 when bandwidth is available. The cut-through queue has a higher priority than either of the write queue 14 or read queue 16.

A complete ATM cell received in the input buffer 11 may be written to the external shared memory 8 should the required destination remain busy. A number of cells may require writing to the shared memory 8 and each activity has to be queued to compete for internal bandwidth. Each command is placed on the write queue 14 and serviced in turn by the queue manager 15 when bandwidth is available.

A complete ATM cell may be read to the output buffer 12 from the shared memory 8. A number of cells may require reading from the shared memory 8 and each activity has to be queued to compete for internal bandwidth. Each command is placed on the read queue 16 and is serviced in turn by the queue manager 15 when bandwidth is available.

The switch fabric data controller ASIC 6 connects to the external shared memory 8 by means of a quarter cell width data bus 17. Whole cells are written to or read from the shared memory 8 on the databus 17 in four 20 nanosecond cycles. This is described in detail below.

The datastream from the output controller 19 of the switch fabric data controller ASIC 6 to each of the four traffic control ASICs 7 is a TDM stream having five repeating slots. An active high synchronisation signal indicates the start of the first slot. Each slot has an interval of seven 100 MHz cycles with the synchronisation signal active during the first cycle of the first slot. A complete eighth cell segment can be transmitted in one such slot. There is a simple fixed mapping between the switch fabric ports 9 associated with a particular traffic control ASIC 7 and the five repeating slots. An ATM cell can be transmitted in the relevant slot as soon as the first quarter cell segment reaches the output buffer 12 and output buffer egress bandwidth availability coincides with the slot time.

Figure 4:
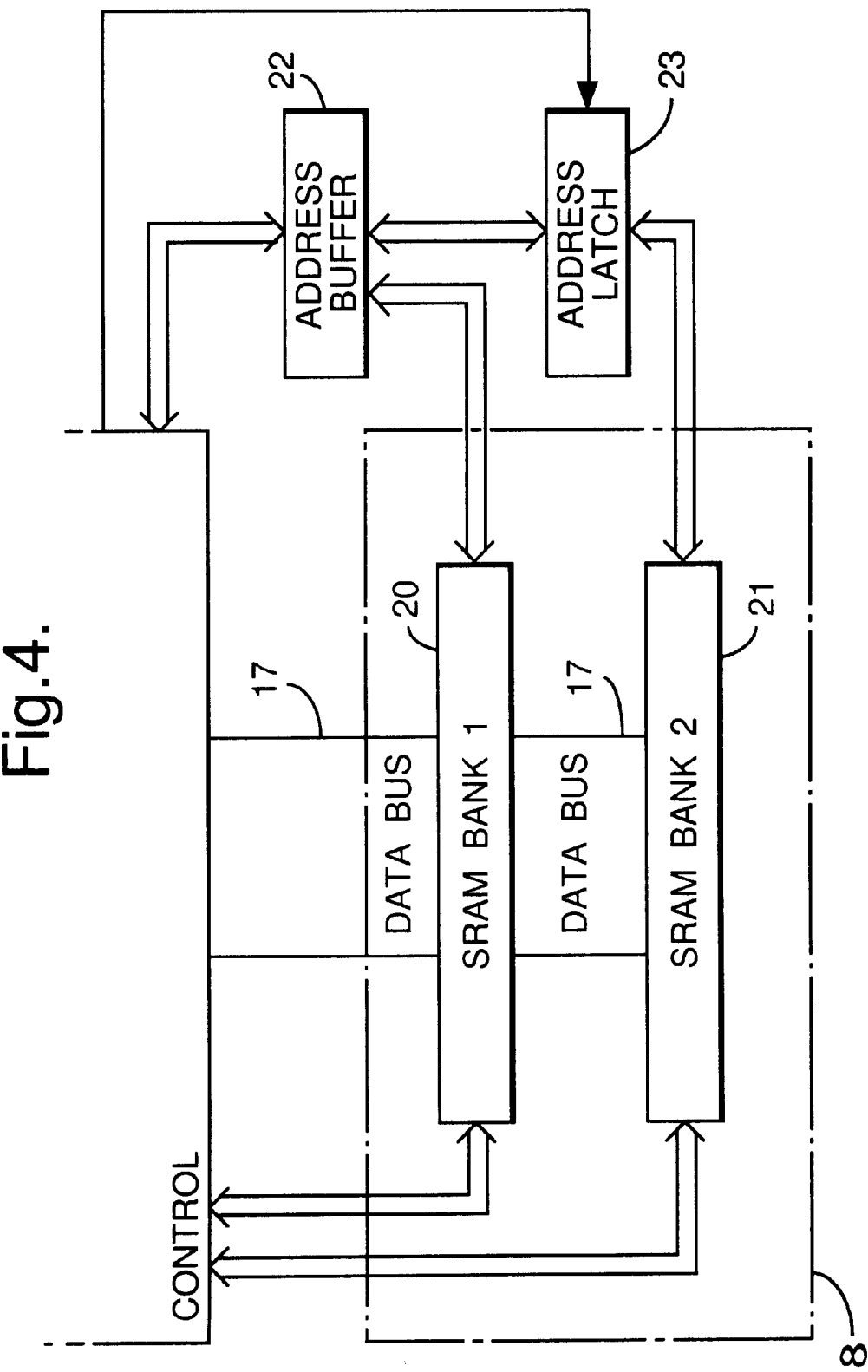
FIGS. 4 and 5 illustrate how ATM cells are written to and read from a shared memory.
Figure 5:
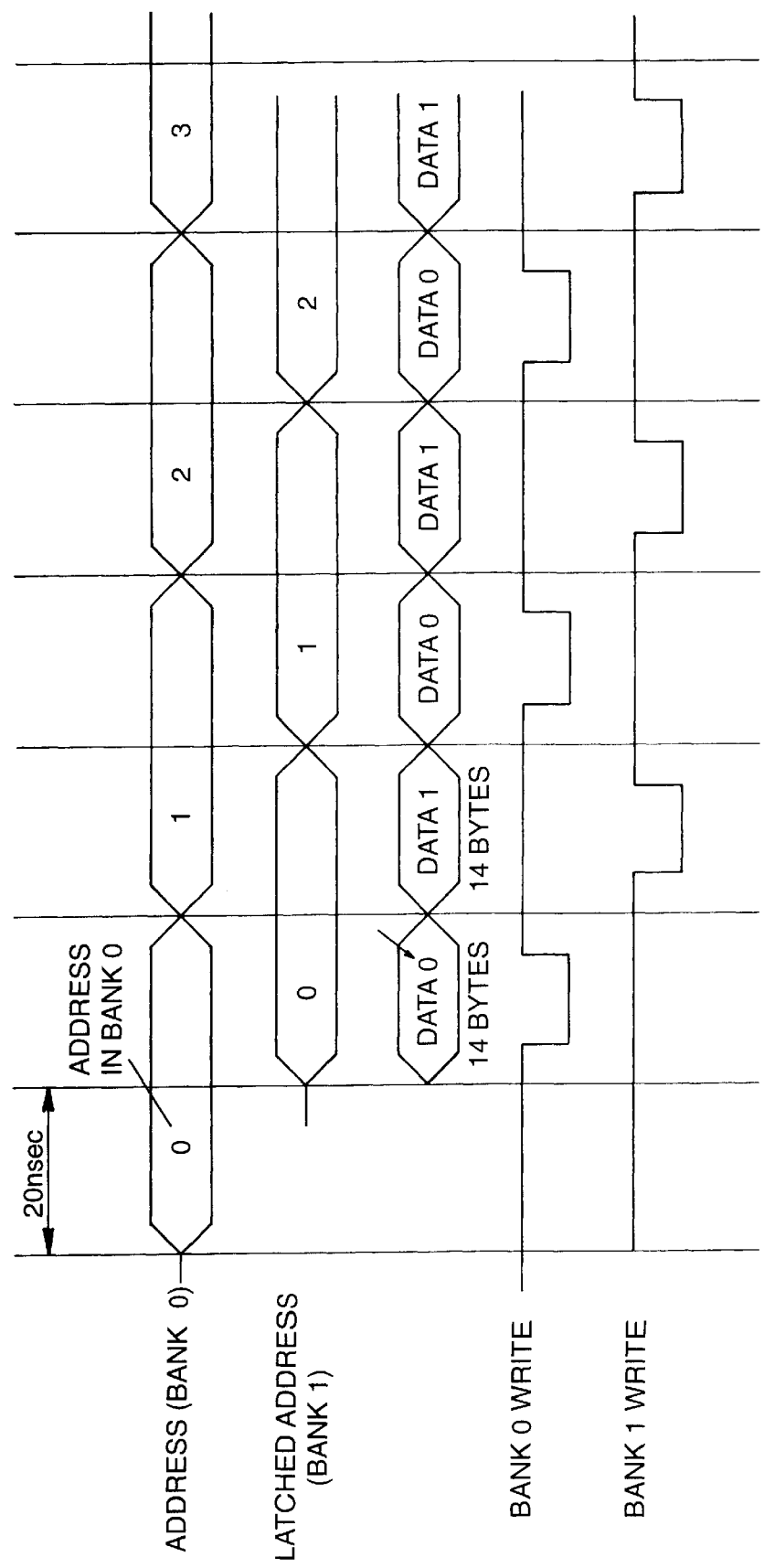

As shown in FIGS. 4 and 5, the shared memory 8 is organised as two 64K deep fast SRAM banks 20, 21 of width 112 bits (one quarter cell segment). The address of the first bank 20 is driven directly from the switch fabric data controller ASIC 6 via an address buffer 22. This first bank 20 holds the first and third quarter cell segments. The second bank 21 is driven by a latched version from an address latch 23 arriving 20 nanoseconds later than the original version. The second bank 21 holds the second and fourth quarter cell segments. FIG. 5 shows the timing diagram of the write cycles for the two banks.

All shared memory transactions consist of four consecutive read cycles or four consecutive write cycles with a dead cycle when a write cycle follows a read cycle. In this way the fast SRAM 20, 21 of the shared memory 8 is used most efficiently and reduces the minimum write times using only a single commercially available fast SRAM by around 10 nanoseconds. This is also less complex because the system only has to deal with complete cells.

To further optimise shared memory bandwidth, the input buffer 11 fill level and the number of queued write operations are constantly monitored by a data controller 24. Queued read operations take priority over the queued write operations by default. This eliminates the occurrence of gaps in continuous cell streams. If at any time more than one and a half cells occupy any input buffer location, the priority switches so that all queued write operations are dealt with before any pending read operations. This has the effect of bunching read cycles together and bunching write cycles together and therefore reducing the number of dead cycles.

Four traffic classes of ATM cell are supported. Connection orientated constant bit rate (CBR) services, connection orientated variable bit rate (VBR) services or connectionless VBR. Connectionless LAN data is supported either by available bit rate (ABR) or unspecified bit rate (UBR). The highest priority is given to the delay sensitive CBR traffic. The second highest priority is given to the VBR traffic. ABR and UBR share the lowest priority with ABR flow controlled and UBR capped.

Figure 6:
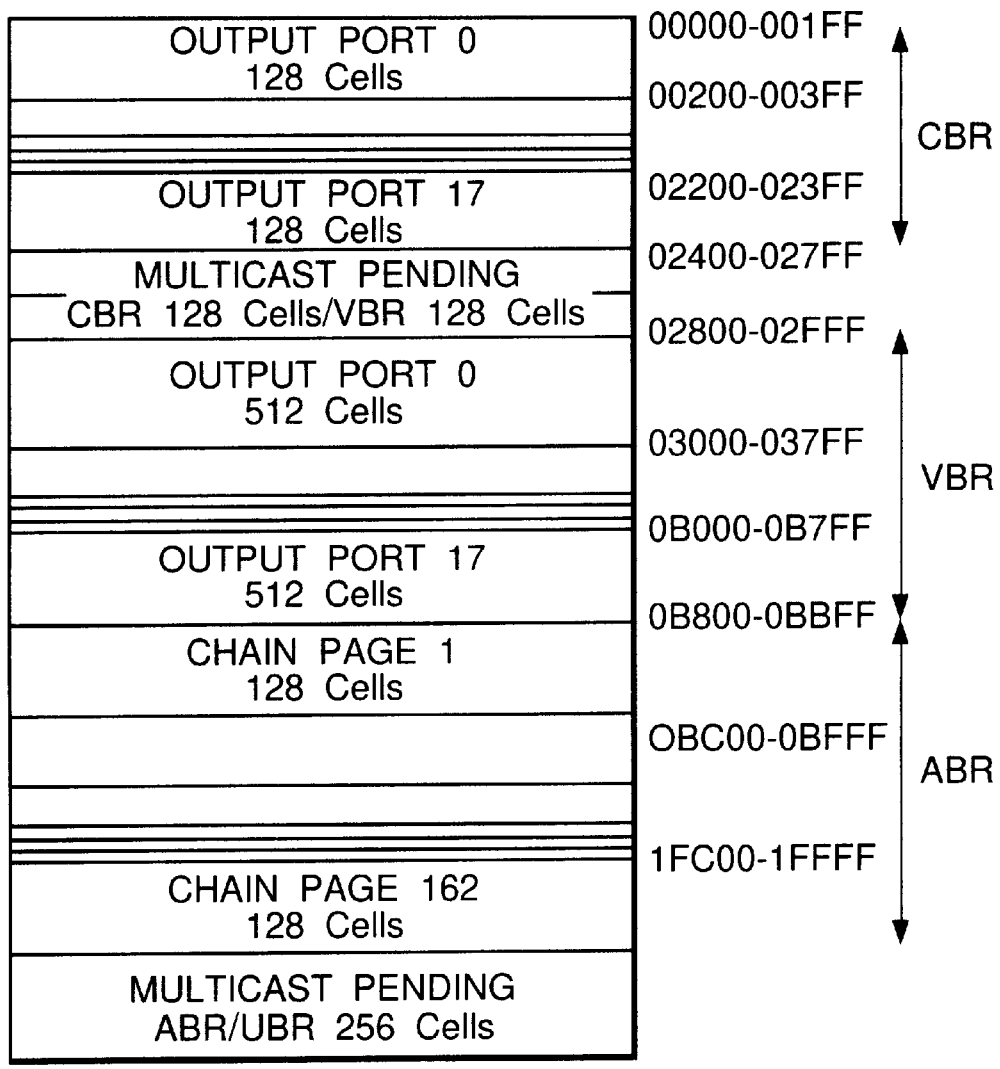
FIG. 6 shows the arrangement of the shared memory for storing ATM cells according to traffic class.

The shared memory 8 is mapped as illustrated in FIG. 6. CBR cells, which have the highest priority of queued unicast (single destination) cells are queued for each switch fabric port 9 in fixed circular queues of 128 cells in capacity. VBR cells are queued in fixed circular queues of 512 cells in capacity.

The remaining external shared memory capacity is divided into pages of 128 cells in capacity. These pages can be chained to form linked lists. These variable length queues are used to store ABR and UBR cells.

Figure 7:
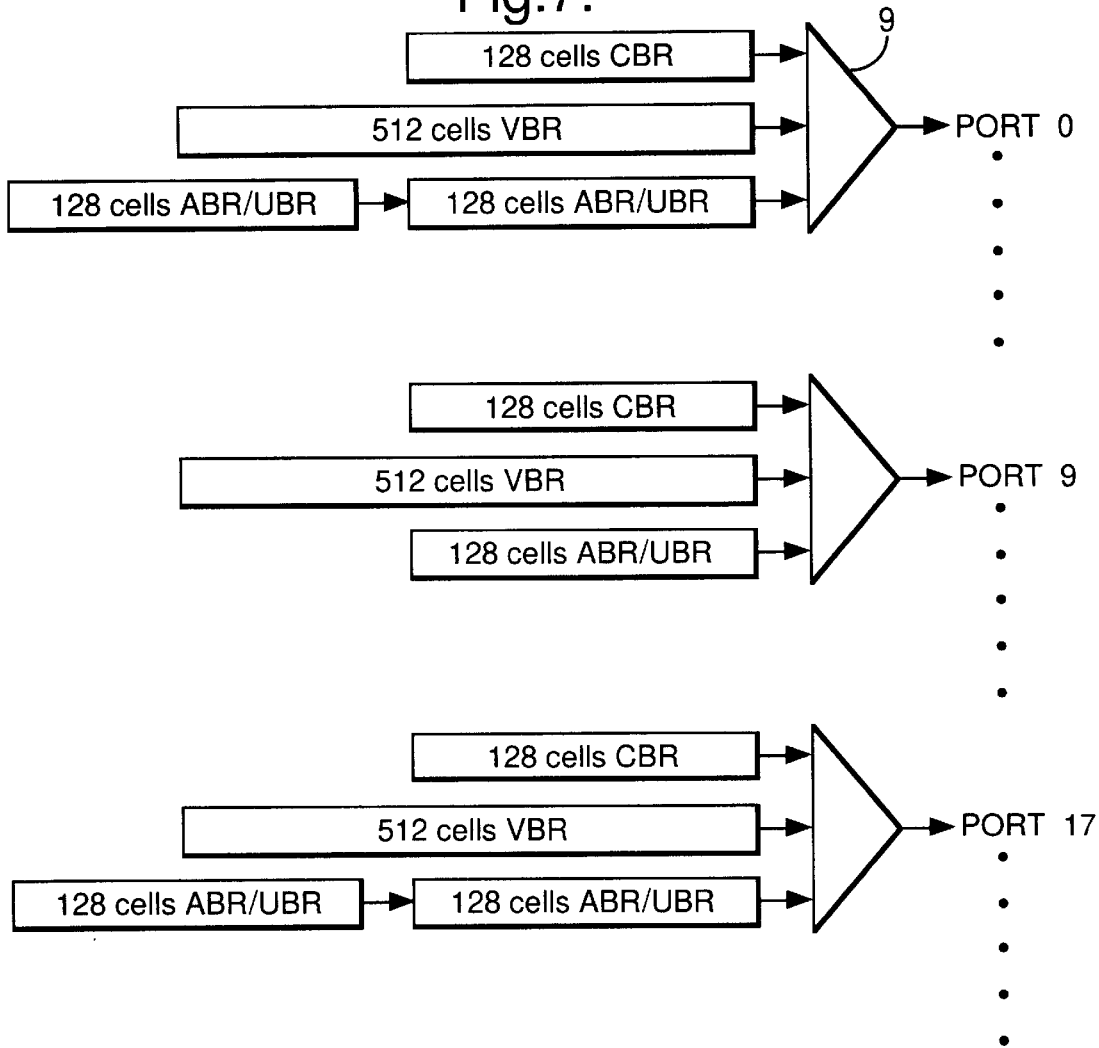
FIG. 7 shows a FIFO queuing arrangement of the shared memory for unicast cells.

As shown in FIG. 7, the shared memory 8 is organised into FIFO queues of ATM cells with separate queues for each priority group allocated to each switch fabric port 9. This is done using a number of pointers and references. This is illustrated in FIG. 7 for unicast cells only. As shown, variable storage is achieved on VBR and UBR queues by chaining pages together to form linked lists.

Each switch fabric port 9 in this example has to completely exhaust each queue from the highest priority downwards. Therefore amongst unicast queues only CBR cells will be transmitted when CBR cells are queued, irrespective of the size of other queues and so on.

Figure 8:
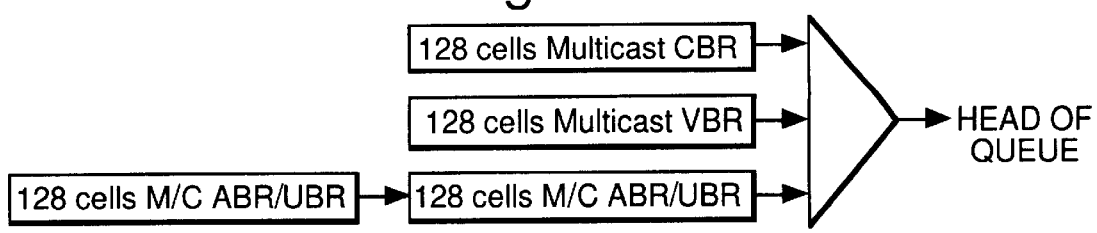
FIG. 8 shows a FIFO queuing arrangement of the shared memory for multicast cells.

Multicast cells are queued separately in a shared memory 8. This can be seen in the shared memory map of FIG. 6 and in the logical representation in FIG. 8. Here, all multicast cells are queued according to traffic class but regardless of destination. The head of queue multicast cell is selected first from the CBR multicast queue until that queue is exhausted, and then from the VBR multicast queue, and so on. The traffic class of the head of queue multicast cell is checked against the highest priority unicast port for each of the intended multicast destinations. When the traffic classes are the same, the multicast cell is transmitted in preference. When the traffic classes differ the multicast cell has the same priority as a unicast cell of the same traffic class. Accordingly, cells are transmitted in the following order: multicast CBR; unicast CBR: multicast VBR; unicast VBR: multicast ABR/UBR; unicast ABR/UBR.

Cut-through of multicast cells operates in a similar fashion to unicast cells. If the output controller 19 recognises that the data is multicast from the internal routing tag, the data is stored in port 18 if it is ABR or UBR traffic and port 19 if it is CBR or VBR traffic. The output controller 19 determines the priority of any data queued for each port addressed by a multicast cell.

We claim:
1. A switch fabric comprising:
   a shared memory;
   a number of switch fabric ports; and,
   a switch fabric data controller for routing blocks of data received at one switch fabric port to one or more other switch fabric ports and writing and reading data to and from, respectively, the shared memory, wherein the switch fabric data controller preferentially routes a block of data from the one switch fabric port to the one or more other switch fabric ports without writing the block of data into the shared memory if the one or more other desired switch fabric ports are free or become free within a predetermined period, and otherwise writes the block of data into the shared memory for temporary storage if the one or more other switch fabric ports are busy.

2. A switch fabric according to claim 1, further comprising at least one traffic concentrator for multiplexing N datastreams for transmission to the switch fabric data controller comprising:
   N input ports;
   an output port; and,
   means for repeatedly generating N slots having a predetermined length for receiving blocks of data arriving at the input ports and transmitting the blocks of data as a multiplexed datastream at the output port, wherein a slot may initially be exclusively allocated to one input port for transmitting blocks of data received at the input port and subsequently the slot can be re-allocated to another input port when the one input port releases control of the slot.

3. A switch fabric according to claim 2, in which the input buffer of the switch fabric data controller stores blocks of data arriving from at least one traffic concentrator and the switch fabric data controller further comprises a separate output buffer for storing blocks of data to be routed from the switch fabric data controller to one or more of the switch fabric ports.

4. A switch fabric according to claim 3, in which both the input buffer and output buffer are each provided with space sufficient to store two blocks of data for each of the N switch fabric ports.

5. A switch fabric according to claim 4, in which the switch fabric data controller is arranged to hold segments of a block of data received sequentially at the input buffer whilst monitoring the output buffer and if a required location in the output buffer associated with a required switch fabric port becomes free before the entire block of data has been received, transfers the entire block of data to the output buffer.

6. A switch fabric according to claim 5, in which if required location in the output buffer is not free by the time the entire block of data is received at the input buffer, the switch fabric data controller is arranged to write the entire block of data to a queue in the shared memory.

7. A switch fabric according to claim 3, in which the switch fabric data controller includes means for repeatedly generating N slots each having a predetermined length for receiving blocks of data arriving at the output buffer and transmitting the blocks of data as a multiplexed datastream from the output buffer to one or more of the switch fabric ports.

8. A switch fabric according to claim 7, in which each of the N slots is permanently and exclusively allocated to one respective switch fabric port for the transmission of blocks of data from the output buffer to the switch fabric port.

9. A switch fabric according to claim 8, in which the length of each slot generated by the switch fabric data controller is fraction ½x of the size of a block of data, where X is a positive integer.

10. A switch fabric according to claim 9, in which the switch fabric further comprises traffic expansion means for demultiplexing the one or more datastreams from the output buffer of the switch fabric data controller ASIC to the switch fabric ports.

11. A switch fabric according to claim 10, in which the traffic concentrator and the traffic expansion means are implemented together on a traffic control ASIC.

12. A switch fabric according to claim 2, in which the length of each slot is a fraction ⅛x of the length of a block of data, where X is a positive integer.

13. A switch fabric according to claim 12, in which a plurality traffic concentrators are connected to the switch fabric data controller.

14. A switch fabric according to claim 12, in which the switch fabric includes a shared memory data bus which is sufficiently wide to transfer the same fraction ⅛x of the block of data to the shared buffer memory as that transferred by a traffic concentrator in a single slot, where X is a positive integer, and the switch fabric data controller is arranged to write and read blocks of data to and from, respectively, the shared memory on the shared memory data bus.

15. A switch fabric according to claim 14, in which the shared memory comprises two banks, each having a predetermined depth and at least the same width as the shared memory data bus.

16. A switch fabric according to claim 15, in which the switch fabric data controller further comprises an address buffer driven by the switch fabric data controller for holding the value of an address in one bank of the shared memory to allow a segment of data from a block of data held in the input buffer of the switch fabric to be written to that address, and an address latch for latching the address held by the address buffer to enable a successive segment of the block of data held in the input buffer to be written sequentially to the corresponding address in the other bank of the shared memory.

17. An asynchronous transfer mode (ATM) switch comprising:

a back plane;

a microprocessor card connected to said back plane;

at least two port cards connected to said back plane; and a switch fabric connected to said back plane, said switch fabric comprising:
a shared memory;
a number of switch fabric ports; and,
a switch fabric data controller for routing blocks of data received at one switch fabric port to one or more other switch fabric ports and writing and reading data to and from, respectively, the shared memory, wherein the switch fabric data controller preferentially routes a block of data from the one switch fabric port to the one or more other switch fabric ports without writing the block of data into the shared memory if the one or more other desired switch fabric ports are free or become free within a predetermined period, and otherwise writes the block of data into the shared memory for temporary storage if the one or more other switch fabric ports are busy.

* * * * *